United States Patent [19]

Miyazawa

[11] Patent Number: 4,868,669
[45] Date of Patent: Sep. 19, 1989

[54] INTEGRATED INPUT/OUTPUT DEVICE
[75] Inventor: Hideyuki Miyazawa, Kawasaki, Japan
[73] Assignee: Ricoh Company, Ltd., Tokyo, Japan
[21] Appl. No.: 79,013
[22] Filed: Jul. 29, 1987
[30] Foreign Application Priority Data
 Jul. 31, 1986 [JP] Japan ................. 61-178965
[51] Int. Cl.4 ............................................. H04H 1/00
[52] U.S. Cl. ................... 358/400; 358/471; 358/494; 346/76 PH
[58] Field of Search ............ 358/256, 294, 293, 280; 346/76 PH; 357/17

[56] References Cited
U.S. PATENT DOCUMENTS

| 4,347,533 | 8/1982 | Ozawa | 358/296 |
| 4,549,223 | 10/1985 | Ozawa | 358/294 |
| 4,609,946 | 9/1986 | Thaler | 358/294 |
| 4,688,050 | 8/1987 | Tsao | 346/76 PH |
| 4,706,128 | 11/1987 | Tamioka et al. | 346/76 PH |
| 4,789,903 | 12/1988 | Kamada et al. | 358/286 |
| 4,795,999 | 1/1989 | Takahashi et al. | 346/76 PH |

Primary Examiner—Edward L. Coles, Sr.
Attorney, Agent, or Firm—Oblon, Spivak, McClelland, Maier & Neustadt

[57] ABSTRACT

An integrated input/output device includes a substrate having a pair of opposite surfaces, and an input function unit is defined on one of the pair of opposite surfaces and an output function unit is defined on the other of the pair of opposite surfaces. In the preferred embodiment, a reading unit for optically reading an original document and a thermal printhead for recording an image on recording paper are defined on opposite surfaces of the same substrate. Such an integrated input/output device is compact in size, thereby contributing to minimize its space requirement for installation, and sturdy in structure.

12 Claims, 3 Drawing Sheets

INTEGRATED INPUT/OUTPUT DEVICE

BACKGROUND OF THE INVENTION

1. Field of the Invention

This invention generally relates to an input/output device for inputting and outputting information to and from an associated apparatus, and more in particular, to an integrated input/output device suitable for use in such an apparatus as a facsimile machine as an integrated reading/recording unit.

2. Description of the Prior Art

An apparatus, such as a facsimile machine, is typically provided with an input device for inputting information and an output device for outputting information. In the case of a facsimile machine, such an input device includes a reading unit for optically reading an original document for converting visual image information into electrical image information, and such an output device includes a recording unit for recording image information on recording paper.

Typical prior art input and output devices are illustrated in FIGS. 4 and 5a and 5b. FIG. 4 schematically shows a prior art facsimile machine which is provided with an input device serving as a reading unit and an output device serving as a recording unit separately. In the structure shown in FIG. 4, the right-hand half defines an input device, which functions as a reading unit, and the left-hand half defines an output device, which functions as a recording unit. As shown, the input device includes a light source 31 for emitting light toward an original document 32 which moves, for example, from left to right in the plane of FIG. 4. The input device also includes a reflecting mirror 33 for reflecting the light from the original document toward an image sensor 35, such as a CCD image sensor, through a focusing lens 34. Also provided in the input device is a sensor driver 36 which is operatively associated with the image sensor 35. As well known in the art, the image sensor 35 is typically comprised of a plurality of photoelectric elements arranged in the form of a single array whose longitudinal direction is normal to the direction of movement of the original document 32. Thus, as the original document 32 moves from left to right, the image information on the original document 32 is optically read line by line by the image sensor 35.

As set forth above, the left-hand half of the structure shown in FIG. 4 defines an output device, which serves as a recording unit, and it includes a roll of recording paper 37, a thermal printhead 38 for recording data on the recording paper 37, and a head driver 39 which is operatively associated with the thermal printhead 38. Thus, image information to be recorded is supplied from the driver 39 to the thermal printhead 38 so that image information is recorded on the recording paper 37. In the structure of FIG. 4, since the input and output devices, serving as reading and recording units, respectively, are provided separately, they occupy a significant amount of space within a machine housing, and, thus, there is a difficulty in making the entire apparatus compact in size. In addition, each of the input and output devices is comprised of various discrete elements, so that it requires alignment among elements and a care in assembling.

FIGS. 5a and 5b illustrate an input device which may serve as a reading unit for use in a facsimile machine. The input device shown in FIGS. 5a and 5b defines a reading unit having no focusing element, such as a lens. That is, this input device includes an LED array 41 as a light source. The input device of FIG. 5 also includes a glass substrate 43 on the bottom surface of which a common electrode 44 is formed. An amorphous silicon film 45 is formed on the common electrode 44, and a transparent electrically conductive film 46 is formed on the amorphous silicon film 45. A metal film 47 is also formed on the transparent electrically conductive film 46. It should be noted that the transparent electrically conductive film 46, together with the overlying metal film 47, is, in fact, divided into strips as spaced apart from each other at a predetermined pitch to define an array of individual electrodes 50. As a result, those portions of the amorphous silicon film 45 which are sandwiched between the common electrode 44 and the individual electrodes 50 define an array of photoelectric elements. A light guiding window 42 is formed at the tip end of each of the individual electrodes 50. A transparent protective film 48 is formed to cover the entire bottom structure of the substrate 43.

With this structure, an original document 49 to be read is moved, for example, from left to right while being kept in contact with the protective film 48. Light emitted from the LED array 41 passes through the windows 42 and impinges on the original document 49, and the light reflecting from the original document 49 is received by the array of photoelectric elements defined in the amorphous silicon film 45 between the common electrode 44 and the individual electrodes 50. The input device shown in FIGS. 5a and 5b is smaller than the input device shown in FIG. 4; however, since it is only an input device, there must be provided a separate output device.

SUMMARY OF THE INVENTION

In accordance with the principle of the present invention, there is provided an integrated input/output device which can function as an input device, such as a reading unit, and also as an output device, such as a recording unit. More specifically, an integrated input/output device constructed in accordance with the present invention, includes a common substrate on which not only an input device but also a recording device is constructed. Since the present input/output device has such an integrated structure, it is easy to be mounted and it occupies only a minimum amount of space for installation. Moreover, the present input/output device is sturdy in structure.

It is therefore a primary object of the present invention to obviate the disadvantages of the prior art as described above and to provide an improved input/output device.

Another object of the present invention is to provide an input/output device having an integrated structure.

A further object of the present invention is to provide an integrated input/output device suitable for use in a facsimile machine as an integrated reading/recording unit.

A still further object of the present invention is to provide an input/output device compact in size and sturdy in structure.

Other objects, advantages and novel features of the present invention will become apparent from the following detailed description of the invention when considered in conjunction with the accompanying drawings.

DESCRIPTION OF THE PREFERRED EMBODIMENTS

Figure 1:
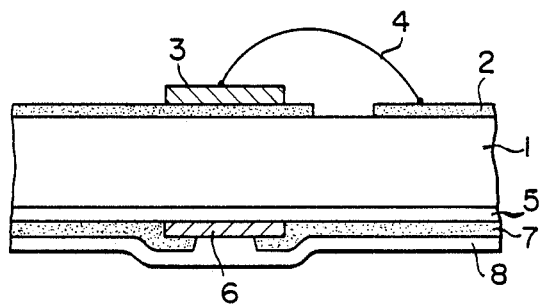
FIG. 1 is a schematic illustration showing an integrated input/output device constructed in accordance with one embodiment of the present invention.

Referring now to FIG. 1, there is schematically shown in cross section an integrated input/output device constructed in accordance with one embodiment of the present invention, which is suitable for use as an integrated reading/recording unit in an apparatus, such as a facsimile machine. As shown in FIG. 1, the integrated input/output device includes a ceramic substrate 1 having opposite top and bottom surfaces which are parallel in the illustrated embodiment. An electrode layer 2 is formed on the top surface of the substrate 1 in a desired pattern, and an LED chip 3 is fixedly mounted on the electrode layer 2. An electrical connection is established between the electrode layer 2 and the LED chip 3 via wire 4. The electrode layer 2 defines a desired interconnection pattern on the top surface of the substrate 1 which is comprised of an electrically insulating material. It is to be noted that the substrate 1 may be comprised of an electrically conductive material. In this case, however, an electrically insulating surface layer should be provided on the top and bottom surfaces of such an electrically conductive substrate. The LED chip 3 serves as a light source for emitting light to be used in optically reading an original image, and the LED chip 3 may include a plurality of light emitting diodes arranged in the form of a single array extending in the direction normal to the plane of the drawing of FIG. 1.

A glaze layer 5 is formed on the bottom surface of the substrate 1, and an electrically resistive layer 6 is formed on the glaze layer 5 in the form of a strip extending in the direction normal to the plane of FIG. 1. A pair of opposite electrodes 7 is formed on both sides of the resistive layer 6. For example, the right-hand side electrode layer 7 is defined as a common electrode which is electrically connected to the right-hand end of the resistive layer 6, and the left-hand electrode layer 7 is defined as individual electrodes which are spaced apart from each other at a predetermined pitch along and each contact with the left-hand end of the resistive layer 6. As a result, there is effectively defined a single array of heat-producing elements along the longitudinal direction of the resistive layer 6, in which each heat-producing element is defined by a portion of the resistive layer 6 which is located between the right-hand side common electrode 7 and the corresponding one of the left-hand side individual electrodes 7. Alternatively, the resistive element 6 may be divided into a plurality of individual elements spaced apart from each other at a predetermined pitch, each associated with the corresponding one of the individual electrodes. In either example, the resistive layer 6 produces heat when current is passed therethrough between the pair of opposite electrodes which are connected to the opposite ends of the resistive layer 6. A protective layer 8 is formed to cover the entire bottom structure of the substrate 1. Such a protective layer 8 is preferably comprised of a wear-resistant material because recording paper, typically thermo-sensitive paper, is brought into sliding contact therewith.

As described above, the structure shown in FIG. 1 includes a light source defined by the LED chip 3 on one surface of the substrate 1 and a thermal printhead defined by the resistive layer 6 on the opposite surface of the substrate 1. Thus, the structure of FIG. 1 indicates an integrated structure of input and output devices on the same substrate 1. That is, the device on the top surface of the substrate 1 emits light to be used for reading of an original document and the device on the bottom surface of the substrate 1 provides a recording function. In the preferred embodiment, the substrate 1 is comprised of a ceramic material which has a high thermal conductivity. Such a structure is preferred because the ceramic substrate 1 can serve as a heat sink for the LED chip 3, thereby maintaining the temperature of the LED chip 3 substantially at constant.

Figure 2:
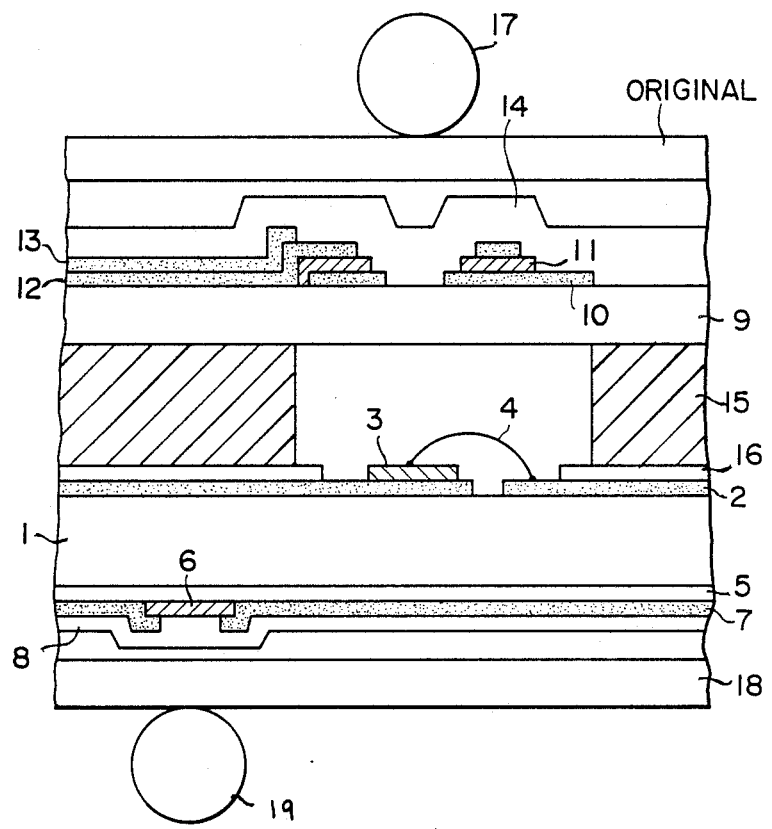
FIG. 2 is a schematic illustration showing an integrated input/output device constructed in accordance with another embodiment of the present invention.

Referring to FIG. 2, there is schematically shown an integrated input/output device constructed in accordance with a further embodiment of the present invention. As will become clear later, the input/output device of FIG. 2 includes the entire structure of FIG. 1 as a part thereof. That is, in the structure of FIG. 1, a light source for use in a reading unit is provided at the top surface of the substrate 1 and a recording unit is defined at the bottom surface of the substrate 1. On the other hand, in the structure of FIG. 2, not only a light source but also an array of photoelectric elements is provided at the top surface of the substrate 1, thereby defining a reading unit at the top surface of the substrate 1.

Described more in detail with reference to FIG. 2, the present integrated input/output device includes a substrate 1 having substantially flat and parallel top and bottom surfaces, an electrode layer 2 having a desired interconnection pattern formed on the top surface of the substrate 1, an LED chip 3 fixedly mounted on the electrode layer 3 as being suitably electrically connected to the electrode layer 2 via wire 4. Also provided in the present device includes a glaze layer 5 formed on the bottom surface of the substrate 1, an electrically resistive layer 6, continuous or segmented, formed on the glaze layer 5, a pair of opposite common and individual electrodes 7 formed on the glaze layer 5 on both sides of the resistive layer 6, and a protective layer 8 covering the entire bottom structure. The structure so far described with reference to FIG. 2 corresponds to the structure shown in FIG. 1.

In the structure shown in FIG. 2, an electrically insulating layer 16 is formed on the electrode layer 2 and a holding or spacer member 15 is fixedly mounted on the insulating layer 16. And, a glass plate 9, which is thus electrically insulating in property, is fixedly mounted on the holding member 15. On the top surface of the glass plate 9 is formed a lower electrode layer 10 which serves as a common electrode. A photoelectric conversion layer 11, typically comprised of a photoconductive material, is formed on the lower electrode layer 10. A transparent electrode layer 12 is formed partly on the glass plate 9 and partly on the photoelectric conversion layer 11, and an upper electrode layer 13 is also formed on the transparent electrode layer 12. Typically, the overlying electrode structure including the transparent electrode layer 12 and the upper electrode layer 13 is segmented as spaced apart from each other at a predetermined pitch, thereby defining a plurality of individual upper electrodes. Thus, those portions of the photoelectric conversion layer 11 which are sandwiched between the lower common electrode layer 10 and the segmented individual upper electrodes 12 and 13 define a single array of photoelectric elements extending in the direction vertical to the plane of FIG. 2. As a modification, the photoelectric conversion layer 11 may also be subdivided to define a signal array of discrete photoelectric elements That portion of the glass plate 9 which is immediately above the LED chip 3 is defined as a window for guiding the light emitted from the LED chip 3 to pass therethrough. It is thus clear that an optical reading unit is defined at the top surface of the substrate 1 and the optical reading unit includes the LED chip 3 as a light source and the photoelectric conversion layer 11 as an image sensor.

Also provided in the structure of FIG. 2 is an upper protective layer 14 which covers the entire structure on the top surface of the glass plate 9. As shown in FIG. 2, an original document to be read is placed in contact with the upper protective layer 14 and there is produced a relative motion between the present integrated input/output device and the original document, so that the image information of the original document may be read by a single array of photoelectric elements line by line. In the illustrated embodiment, a feed roller 17 is provided, so that the original document in contact with the upper protective layer 14 moves relative to the present integrated input/output device, for example, from left to right in FIG. 2. Also shown in FIG. 2 is a sheet of recording paper, such as thermo-sensitive paper, 18 placed in contact with the lower protective layer 8 and a feed roller 19. Thus, when the feed roller 19 is driven to rotate in a feeding direction, the recording paper 18 is caused to move relative to and in contact with the bottom surface of the present integrated input/output device, so that an image may be recorded on the recording paper 18.

The structure shown in FIG. 2 provides a completely integrated input/output device which can provide not only an input function, such as a reading function, but also an output function, such as a recording function. And, in the structure of FIG. 2, input and output functions are provided on opposite surfaces of the substrate 1. The holding member 15 is a spacer between the substrate 1 and the glass plate 9, and it is preferably comprised of a metal, such as aluminum, which is high in thermal conductivity and reflectivity. When the present input/output device of FIG. 2 is operated as an input device, the LED array 3 is activated to lead the emitted light toward the original document through the widow so as to illuminate the original document. And, the light reflecting from the original document is received by the array of photoelectric elements defined in the layer 11, thereby converting the light image information into electrical image information. On the other hand, when the present input/output device of FIG. 2 is to be operated as an output device, an image data is supplied to the array of heat-producing or resistive elements defined in the resistive layer 6, thereby producing a heat pattern which is applied to the recording paper 18. In this manner, in the structure of the present input/output device, the input and output functions provided on opposite surfaces of the substrate 1 are functionally independent from each other. Thus, these different input and output functions can be provided at the same time without interference.

Figure 3:
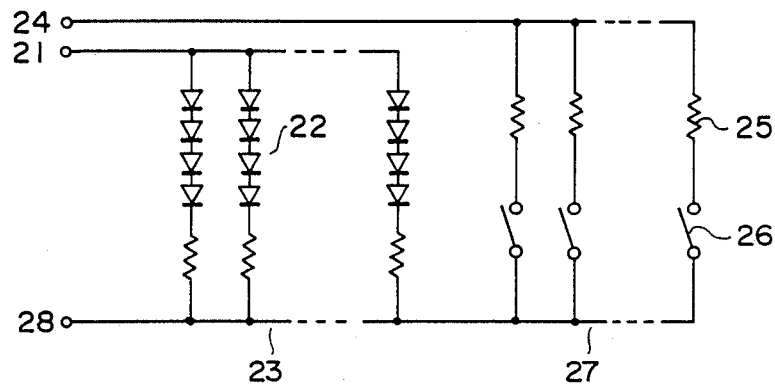
FIG. 3 is a circuit diagram showing an electrical equivalent of an integrated input/output device constructed in accordance with a further embodiment of the present invention.
Figure 4:
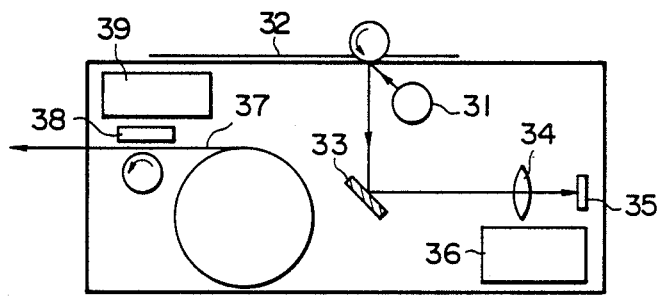
FIG. 4 is a schematic illustration showing a typical prior art facsimile machine provided with separate input and output devices.
Figure 5A:
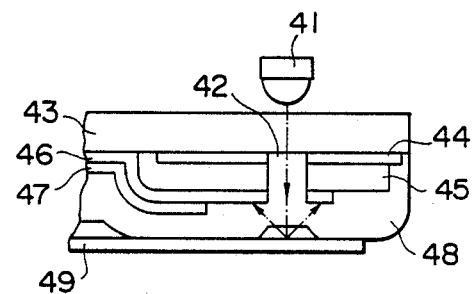
FIGS. 5a and 5b are schematic illustrations showing another prior art input device which has no focusing element and which is suitable for use in a facsimile machine as a reading unit.
Figure 5B:
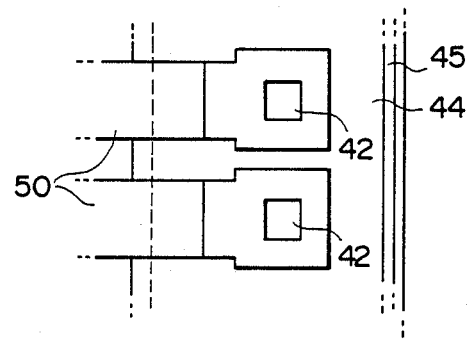

FIG. 3 illustrates in circuit diagram a further embodiment of the present invention, which may be realized as a modification of each of the previously described embodiments shown in FIGS. 1 and 2. As shown in FIG. 3, the present input/output device includes an array of LEDs 23 which serves as a light source and which is provided on one surface of a substrate. An array of heat-producing or resistor elements 27, which defines a recording unit, is provided on the opposite surface of the substrate. The LED array 23 comprises a plurality of series connected light-emitting diodes 22 which are connected in parallel between a power terminal 21, which is connected to a power source, and a common terminal 28. The thermal recording unit 27 includes a plurality of series-connections of heat-producing o resistor elements 25 and switches 26, which are connected in parallel between a thermal printhead power supply terminal 24 and the common terminal 28. Preferably, the switches 26 are constructed by electronics switches, such as transistors, and these switches 26 are selectively closed in accordance with an image signal, thereby causing current to flow through the resistors 25 selectively. The important aspect of the structure shown in FIG. 3 is the fact that the LED array 23 and the resistor array 27 have the common terminal 28, which may be set at ground potential or any other reference potential. With this structure, the number of pins may be reduced at least by one.

While the above provides a full and complete structure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An integrated input/output device, comprising:
   a substrate having a pair of first and second opposite surfaces;
   light emitting means provided at said first surface, said light emitting means comprising a light-emitting diode; and
   recording means provided at said second surface, said recording means comprising a thermal print heat provided with heat-producing elements.

2. The device of claim 1, further comprising photoelectric converting means provided at said first surface, said photoelectric converting means being so disposed to receive light emitted from said light emitting means after having been reflected from an original to be read.

3. The device of claim 1 wherein said substrate is comprised of an electrically insulating material.

4. The device of claim 3 wherein said electrically insulating material includes a ceramic material.

5. The device of claim 1 further including an electrode layer having a desired interconnection pattern formed on the first surface of said substrate, and wherein said light emitting means is fixedly mounted on said electrode layer.

6. The device of claim 5 wherein said light emitting means includes an array of light emitting diodes.

7. The device of claim 2 further comprising a glaze layer formed on said second surface of said substrate, and wherein said recording means is formed on said glaze layer.

8. The device of claim 7 wherein said recording means includes an electrically resistive layer formed on said glaze layer and a pair of first and second opposite electrodes, said first electrode being a common electrode electrically connected to one end of said electrically resistive layer and said second electrode being segmented into a plurality of individual electrodes electrically connected to an opposite end of said electrically resistive layer, whereby those portions of said electrically resistive layer sandwiched between said first common and second individual electrodes define an array of heat-producing elements.

9. The device of claim 8 wherein said common electrode of said recording means is electrically connected to one end of each of said light emitting diodes defining an array.

10. The device of claim 8 further comprising an electrically insulating plate fixedly attached to said substrate with a holding member sandwiched therebetween, and said photoelectric converting means is disposed on said plate.

11. The device of claim 10 wherein said photoelectric converting means includes a lower electrode layer formed on said plate, a photoelectric converting layer formed on said lower electrode, and an upper electrode layer formed on said photoelectric converting layer, whereby one of said upper and lower electrode layers is segmented to define a plurality of individual electrodes while the other defining a common electrode.

12. The device of claim 1 wherein said input/output device is a reading/recording unit suitable for use in a facsimile machine.

* * * * *